(No Model.)
T. V. HANDLOSER.
BRAKE FOR BICYCLES.
No. 557,805.  Patented Apr. 7, 1896.
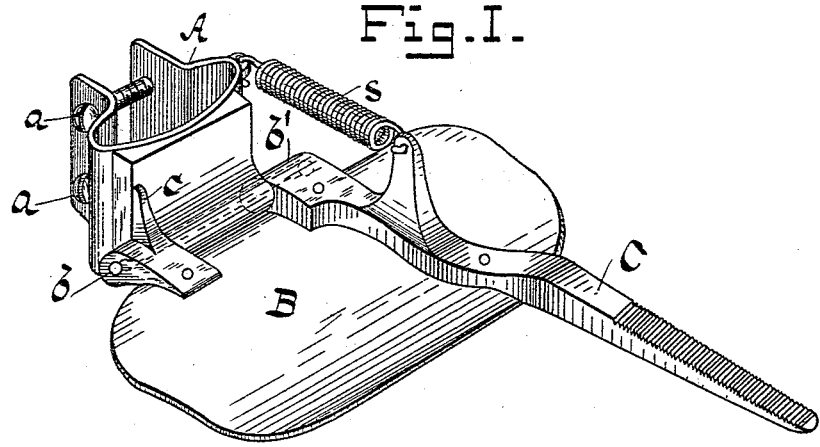
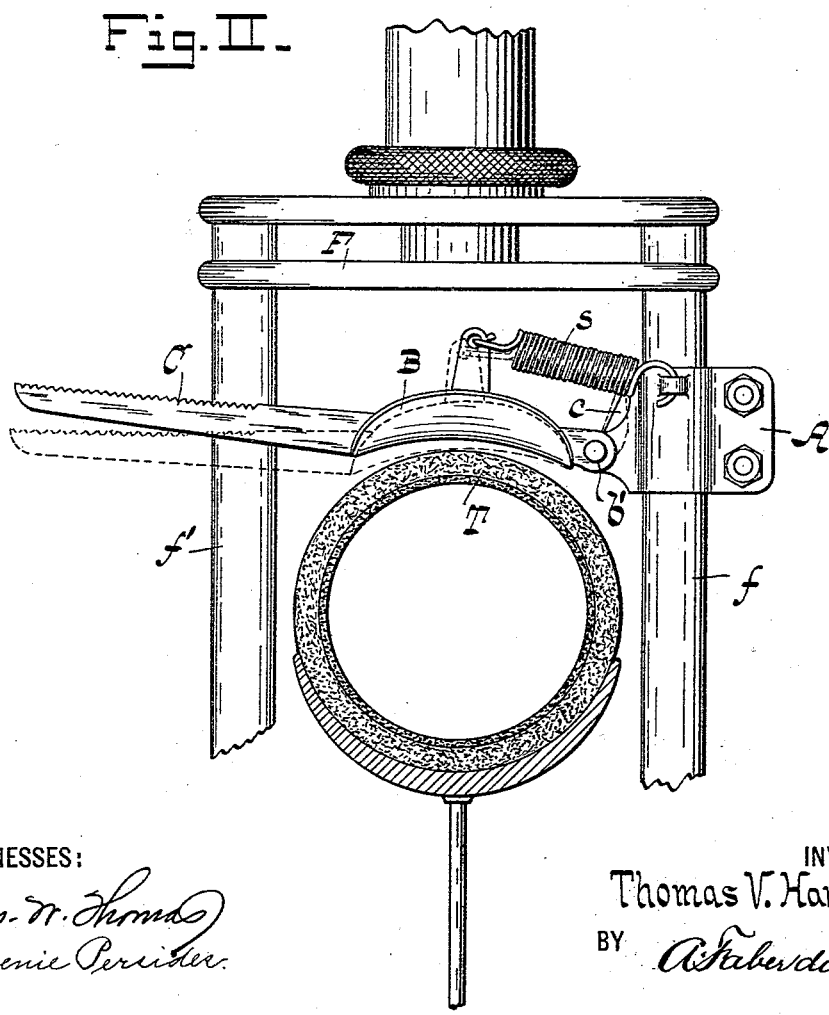
WITNESSES:
Chas. W. Thomas
Eugenie Perrider
INVENTOR:
Thomas V. Handloser,
BY A. Faber du Faur
ATTORNEY

United States Patent Office.

THOMAS V. HANDLOSER, OF NEW YORK, N. Y.

BRAKE FOR BICYCLES.

SPECIFICATION forming part of Letters Patent No. 557,805, dated April 7, 1896.

Application filed December 29, 1894. Serial No. 533,238. (No model.)

*To all whom it may concern:*

Be it known that I, THOMAS V. HANDLOSER, a citizen of the United States of America, and a resident of New York, in the county and State of New York, have invented certain new and useful Improvements in Brakes for Bicycles, of which the following is a specification.

My invention has reference to a brake for bicycles, having for its object to produce at a low cost a light and effective brake which can be readily and conveniently operated by the foot of the rider.

To this end my invention consists, essentially, in the combination, with a bicycle or other form of velocipede, of a brake-lever adapted to be attached to the front fork and extending laterally across the same, said lever being provided with a shoe arranged to engage with the front wheel upon its depression.

The nature of my said invention will best be understood when described in connection with the annexed drawings, in which—

Figure 1 is a perspective view of a brake embodying my invention. Fig. 2 is a vertical cross-section of a bicycle with the brake attached, part being broken away.

Similar letters of reference designate corresponding parts.

Referring to the drawings, the letter A designates a clamp of any suitable construction adapted to embrace one member $f$ of the front fork F of the bicycle. In the present example I have shown a spring-clamp provided with bolts or screws $a$ for drawing the same up onto the fork, this construction being preferable, as it permits the brake to be adapted to bicycles having members of different sizes or cross-sections. To this clamp or base is pivoted at $b$ a brake-shoe B, adapted to engage, when depressed, with the periphery of the tire T. Combined with said brake-shoe is a foot-lever C, pivoted at $b'$ on the same pintle as the brake-shoe. Said lever extends laterally outward and past the second member $f'$ of the front fork a sufficient distance to afford room for the foot of the rider. A spring $s$, connected with the lever C and with the clamp A, normally holds the brake-shoe out of contact with the tire. A suitable stop $c$, engaging the clamp, limits the upward movement of the brake-shoe.

What I claim as new is—

1. A brake for velocipedes, comprising a clamp adapted to embrace one fork member only, a brake-lever hinged to said clamp to extend across the other member and to swing in a plane at right angles to the plane of the wheel, a brake-shoe attached to the lever to fall between the two members of the fork, and a retractile spring attached to the lever and the clamp, substantially as described.

2. The combination with a bicycle, or other velocipede, of a brake-lever hinged to one member of the fork and extending laterally across the second member and provided with a brake-shoe between the two members adapted to engage the wheel, substantially as described.

In testimony that I claim the foregoing as my invention I have signed my name, in presence of two witnesses, this 20th day of November, 1894.

THOMAS V. HANDLOSER.

Witnesses:
J. H. FRANKFURTER,
GEORGE BRETTELL.